(12) United States Patent
Schreter et al.

(10) Patent No.: US 9,875,024 B2
(45) Date of Patent: Jan. 23, 2018

(54) EFFICIENT BLOCK-LEVEL SPACE ALLOCATION FOR MULTI-VERSION CONCURRENCY CONTROL DATA

(71) Applicants: Ivan Schreter, Malsch (DE); Amarnadh Sai Eluri, Pleasanton, CA (US)

(72) Inventors: Ivan Schreter, Malsch (DE); Amarnadh Sai Eluri, Pleasanton, CA (US)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 14/553,680

(22) Filed: Nov. 25, 2014

(65) Prior Publication Data
US 2016/0147448 A1     May 26, 2016

(51) Int. Cl.
*G06F 17/30* (2006.01)
*G06F 3/06* (2006.01)
*G06F 12/00* (2006.01)

(52) U.S. Cl.
CPC .......... *G06F 3/0604* (2013.01); *G06F 3/0631* (2013.01); *G06F 3/0647* (2013.01); *G06F 3/0673* (2013.01); *G06F 12/00* (2013.01); *G06F 17/30356* (2013.01)

(58) Field of Classification Search
None
See application file for complete search history.

(56) References Cited

U.S. PATENT DOCUMENTS

| | | |
|---|---|---|
| 5,222,235 A | 6/1993 | Hintz et al. |
| 5,594,898 A | 1/1997 | Dalal et al. |
| 5,701,480 A | 12/1997 | Raz |
| 5,717,919 A * | 2/1998 | Kodavalla ......... G06F 17/30339 |
| 5,758,145 A | 5/1998 | Bhargava et al. |
| 5,794,229 A | 8/1998 | French et al. |
| 5,870,758 A | 2/1999 | Bamford et al. |
| 5,933,833 A | 8/1999 | Musashi |

(Continued)

FOREIGN PATENT DOCUMENTS

| | | |
|---|---|---|
| EP | 2778961 A1 | 9/2014 |
| WO | WO-01/29690 A2 | 4/2001 |

OTHER PUBLICATIONS

"HANA Database Lectures" Mar. 2014 *Yeditepe Üniversitesi Bilgisayar Mühendisliği Bölümü*. Web. Apr. 22, 2016. <http://cse.yeditepe.edu.tr/~odemir/spring2014/cse415/HanaDatabase.pdf>.

(Continued)

*Primary Examiner* — Ryan Bertram
*Assistant Examiner* — Trang Ta
(74) *Attorney, Agent, or Firm* — Mintz Levin Cohn Ferris Glovsky and Popeo, P.C.

(57) ABSTRACT

Lockless allocation of a block from a page is initiated by computing a needed block size from an original block header value. Thereafter, a currently used block size and a capacity of the page are determined. A new block size is then computed based on the currently used block size and the needed block size and a remaining capacity of the page. A new block header value is subsequently generated that includes the determined new block size and the determined remaining capacity of the page The original block header value is then replaced with the new block header value. Related apparatus, systems, techniques and articles are also described.

20 Claims, 16 Drawing Sheets

(56) References Cited

U.S. PATENT DOCUMENTS

| | | | |
|---|---|---|---|
| 6,275,830 B1 | 8/2001 | Muthukkaruppan et al. |
| 6,282,605 B1 | 8/2001 | Moore |
| 6,490,670 B1* | 12/2002 | Collins | G06F 12/023 |
| | | | 711/173 |
| 6,606,617 B1 | 8/2003 | Bonner et al. |
| 6,668,263 B1 | 12/2003 | Cranston et al. |
| 6,754,653 B2 | 6/2004 | Bonner et al. |
| 6,865,577 B1 | 3/2005 | Sereda |
| 7,698,712 B2 | 4/2010 | Schreter |
| 8,024,296 B1 | 9/2011 | Gopinathan et al. |
| 8,161,024 B2 | 4/2012 | Renkes et al. |
| 8,364,648 B1* | 1/2013 | Sim-Tang | G06F 17/30368 |
| | | | 707/674 |
| 8,510,344 B1 | 8/2013 | Briggs et al. |
| 8,650,583 B2 | 2/2014 | Schreter |
| 8,732,139 B2 | 5/2014 | Schreter |
| 8,768,891 B2 | 7/2014 | Schreter |
| 9,058,268 B1 | 6/2015 | Ostiguy et al. |
| 9,098,522 B2 | 8/2015 | Lee et al. |
| 9,141,435 B2 | 9/2015 | Wein |
| 9,262,330 B2 | 2/2016 | Muthukumarasamy |
| 9,268,810 B2 | 2/2016 | Andrei et al. |
| 9,275,095 B2 | 3/2016 | Bhattacharjee et al. |
| 9,275,097 B2 | 3/2016 | DeLaFranier et al. |
| 9,305,046 B2 | 4/2016 | Bhattacharjee et al. |
| 9,372,743 B1 | 6/2016 | Sethi et al. |
| 9,489,409 B2 | 11/2016 | Sharique et al. |
| 2001/0051944 A1 | 12/2001 | Lim et al. |
| 2002/0107837 A1 | 8/2002 | Osborne et al. |
| 2002/0156798 A1 | 10/2002 | Larue et al. |
| 2003/0028551 A1 | 2/2003 | Sutherland |
| 2003/0065652 A1 | 4/2003 | Spacey |
| 2003/0204534 A1 | 10/2003 | Hopeman et al. |
| 2003/0217075 A1 | 11/2003 | Nakano et al. |
| 2004/0034616 A1 | 2/2004 | Witkowski et al. |
| 2004/0054644 A1 | 3/2004 | Ganesh et al. |
| 2004/0249838 A1 | 12/2004 | Hinshaw et al. |
| 2005/0027692 A1 | 2/2005 | Shyam et al. |
| 2005/0097266 A1* | 5/2005 | Factor | G06F 11/1474 |
| | | | 711/112 |
| 2005/0234868 A1 | 10/2005 | Terek et al. |
| 2008/0046444 A1 | 2/2008 | Fachan et al. |
| 2008/0247729 A1 | 10/2008 | Park |
| 2009/0064160 A1 | 3/2009 | Larson et al. |
| 2009/0094236 A1 | 4/2009 | Renkes et al. |
| 2009/0254532 A1 | 10/2009 | Yang et al. |
| 2009/0287737 A1 | 11/2009 | Hammerly |
| 2010/0008309 A1 | 1/2010 | Cheng et al. |
| 2010/0082545 A1 | 4/2010 | Bhattacharjee et al. |
| 2010/0287143 A1* | 11/2010 | Di Carlo | G06F 17/30595 |
| | | | 707/693 |
| 2011/0087854 A1* | 4/2011 | Rushworth | G06F 12/023 |
| | | | 711/170 |
| 2011/0145835 A1* | 6/2011 | Rodrigues | G06F 9/526 |
| | | | 719/312 |
| 2011/0153566 A1 | 6/2011 | Larson et al. |
| 2011/0302143 A1 | 12/2011 | Lomet |
| 2012/0011106 A1 | 1/2012 | Reid et al. |
| 2012/0047126 A1* | 2/2012 | Branscome | G06F 17/30519 |
| | | | 707/714 |
| 2012/0102006 A1 | 4/2012 | Larson et al. |
| 2012/0137081 A1 | 5/2012 | Shea |
| 2012/0179877 A1 | 7/2012 | Shriraman et al. |
| 2012/0191696 A1 | 7/2012 | Renkes et al. |
| 2012/0233438 A1 | 9/2012 | Bak et al. |
| 2012/0265728 A1 | 10/2012 | Plattner et al. |
| 2012/0284228 A1 | 11/2012 | Ghosh et al. |
| 2013/0054936 A1* | 2/2013 | Davis | G11C 29/76 |
| | | | 711/209 |
| 2013/0091162 A1 | 4/2013 | Lewak |
| 2013/0097135 A1 | 4/2013 | Goldberg |
| 2013/0346378 A1* | 12/2013 | Tsirogiannis | G06F 12/023 |
| | | | 707/693 |
| 2014/0025651 A1 | 1/2014 | Schreter |
| 2014/0101093 A1 | 4/2014 | Lanphear et al. |
| 2014/0214334 A1 | 7/2014 | Plattner et al. |
| 2014/0279930 A1* | 9/2014 | Gupta | G06F 11/1464 |
| | | | 707/683 |
| 2014/0279961 A1 | 9/2014 | Schreter et al. |
| 2015/0039573 A1 | 2/2015 | Bhattacharjee et al. |
| 2015/0089125 A1 | 3/2015 | Mukherjee et al. |
| 2015/0113026 A1 | 4/2015 | Sharique et al. |
| 2015/0142819 A1* | 5/2015 | Florendo | G06F 17/30312 |
| | | | 707/741 |
| 2016/0103860 A1 | 4/2016 | Bhattacharjee et al. |
| 2016/0125022 A1 | 5/2016 | Rider et al. |
| 2016/0147445 A1 | 5/2016 | Schreter et al. |
| 2016/0147447 A1 | 5/2016 | Blanco et al. |
| 2016/0147448 A1 | 5/2016 | Schreter et al. |
| 2016/0147449 A1 | 5/2016 | Andrei et al. |
| 2016/0147457 A1 | 5/2016 | Legler et al. |
| 2016/0147459 A1 | 5/2016 | Wein et al. |
| 2016/0147617 A1 | 5/2016 | Lee et al. |
| 2016/0147618 A1 | 5/2016 | Lee et al. |
| 2016/0147750 A1 | 5/2016 | Blanco et al. |
| 2016/0147776 A1 | 5/2016 | Florendo et al. |
| 2016/0147778 A1 | 5/2016 | Schreter et al. |
| 2016/0147786 A1 | 5/2016 | Andrei et al. |
| 2016/0147801 A1 | 5/2016 | Wein et al. |
| 2016/0147804 A1 | 5/2016 | Wein et al. |
| 2016/0147806 A1 | 5/2016 | Blanco et al. |
| 2016/0147808 A1 | 5/2016 | Schreter et al. |
| 2016/0147809 A1 | 5/2016 | Schreter et al. |
| 2016/0147811 A1 | 5/2016 | Eluri et al. |
| 2016/0147812 A1 | 5/2016 | Andrei et al. |
| 2016/0147813 A1 | 5/2016 | Lee et al. |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter et al. |
| 2016/0147862 A1 | 5/2016 | Schreter et al. |
| 2016/0147904 A1 | 5/2016 | Wein et al. |
| 2016/0147906 A1 | 5/2016 | Schreter et al. |

OTHER PUBLICATIONS

"HANA Persistence: Shadow Pages." Jun. 2013. Yeditepe Üniversitesi Bilgisayar Mühendisli?i Bölümü. Web. Apr. 21, 2016; <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014. Web. Mar. 3, 2016.

Brown, E. et al. "Fast Incremental Indexing for Full-Text Information Retrieval." VLDB '94 *Proceedings of the 20th International Conference on Very Large Data Bases*. San Francisco: Morgan Kaufmann, 1994.

Jens Krueger et al. "Main Memory Databases for Enterprise Applications." Industrial Engineering and Engineering Management (IE&EM), 2011 IEEE 18th International Conference on, IEEE, Sep. 3, 2011, pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

"NBit Dictionary Compression," Sybase, May 23, 2013. Web. Mar. 15, 2017 <http://infocenter.sybase.com/help/index.jsp?topic=/com.

(56) References Cited

OTHER PUBLICATIONS sybase.infocenter.dc1777.1600/doc/html/wi11345808527844.html>.

* cited by examiner

EFFICIENT BLOCK-LEVEL SPACE ALLOCATION FOR MULTI-VERSION CONCURRENCY CONTROL DATA

TECHNICAL FIELD

The subject matter described herein relates an in-memory database system providing efficient block-level space allocation for multi-version concurrency control data.

BACKGROUND

In-memory databases are database management systems in which data is primarily stored transiently; namely in main memory. In order to obtain optimum performance, as much data as possible must be kept in memory. However, given the large number of concurrent transactions, multi-version concurrency control (MVCC) mechanisms are adopted to provide point in time consistent views on the underlying data.

SUMMARY

In one aspect, lockless allocation of a block from a page is initiated by computing a needed block size from an original block header value. Thereafter, a currently used block size and a capacity of the page are determined. A new block size is then computed based on the currently used block size and the needed block size and a remaining capacity of the page. A new block header value is subsequently generated that includes the determined new block size and the determined remaining capacity of the page The original block header value is then replaced with the new block header value.

The replacing can use a compare and swap operation. The determining, computing, and generating can be iteratively implemented until the original block header value is replaced with the new block header value.

A pointer to the block can be returned after replacing the original block header value with the new block header value. The pointer can point to a location in the block equal to the starting of the page plus the currently used block size. The location can be part of a block handle.

In another interrelated aspect, allocation of a block from a new page is initiated in a multi-version concurrency control (MVCC) page chain by obtaining a first current last page number in the MVCC page chain. Thereafter, a mutex lock is acquired that prevents allocation of pages in the page chain. Next, a second current last page number is obtained in the MVCC page chain. Subsequently, it is attempted to allocate a block from a last page in the MVCC page chain if the first current last page number and the second page number differ. A new MVCC page can be allocated in the MVCC page chain if the attempt to allocate the block fails or if there is no change in the last page. A new block can be allocated with a specified block size from a newly allocated page using lockless block allocation logic that returns a pointer to the block. The allocated new page is then appended to the MVCC page chain. The mutex lock is then released and a block handle holding the allocated new block is then returned.

In still a further interrelated aspect, allocation of a block from a last page in a multi-version concurrency control (MVCC) page chain is initiated by attempting to return a block from a lockless free list (e.g, a free reserved stub list, a free stub list, or free MVCC blocks, etc.) implemented using a free queue, or, if no block is available, then allocating a block from the last page. Thereafter, a last page of an MVCC page chain is loaded. Thereafter, it is attempted to allocate the block using lockless block allocation from the last page in the MVCC page chain if the last page is valid. The block is allocated from a new page if the attempt to allocate fails or there are no changes in the pages. In addition, a block handle associated with allocated new block is returned.

The free list can include destroyed MVCC blocks and can be managed as a lock-less queue.

The block can be returned from an MVCC free block list for blocks with header and data sections. The block can be returned from a free reserved stub list or free stub list for stub timestamp blocks (with the block only having a header section, i.e., no data). The block can be returned from a free stub block list the block from the pages using a lock-less block allocation algorithm (with the block only having a header section, i.e., no data). Allocation of a block can be attempted a block from the MVCC pages of the MVCC page chain either from a last page or from a newly allocated page.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc. Further, the current subject matter can be implemented and/or form part of an in-memory database such as columnar in-memory database.

The subject matter described herein provides many technical advantages. For example, the current subject matter is advantageous in that it expands on available row state information to provide lockless allocation of blocks of memory from a page. In particular, the current subject matter enables for differentiation among blocks that have been cleaned up and blocks that have been garbage collected.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like), for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
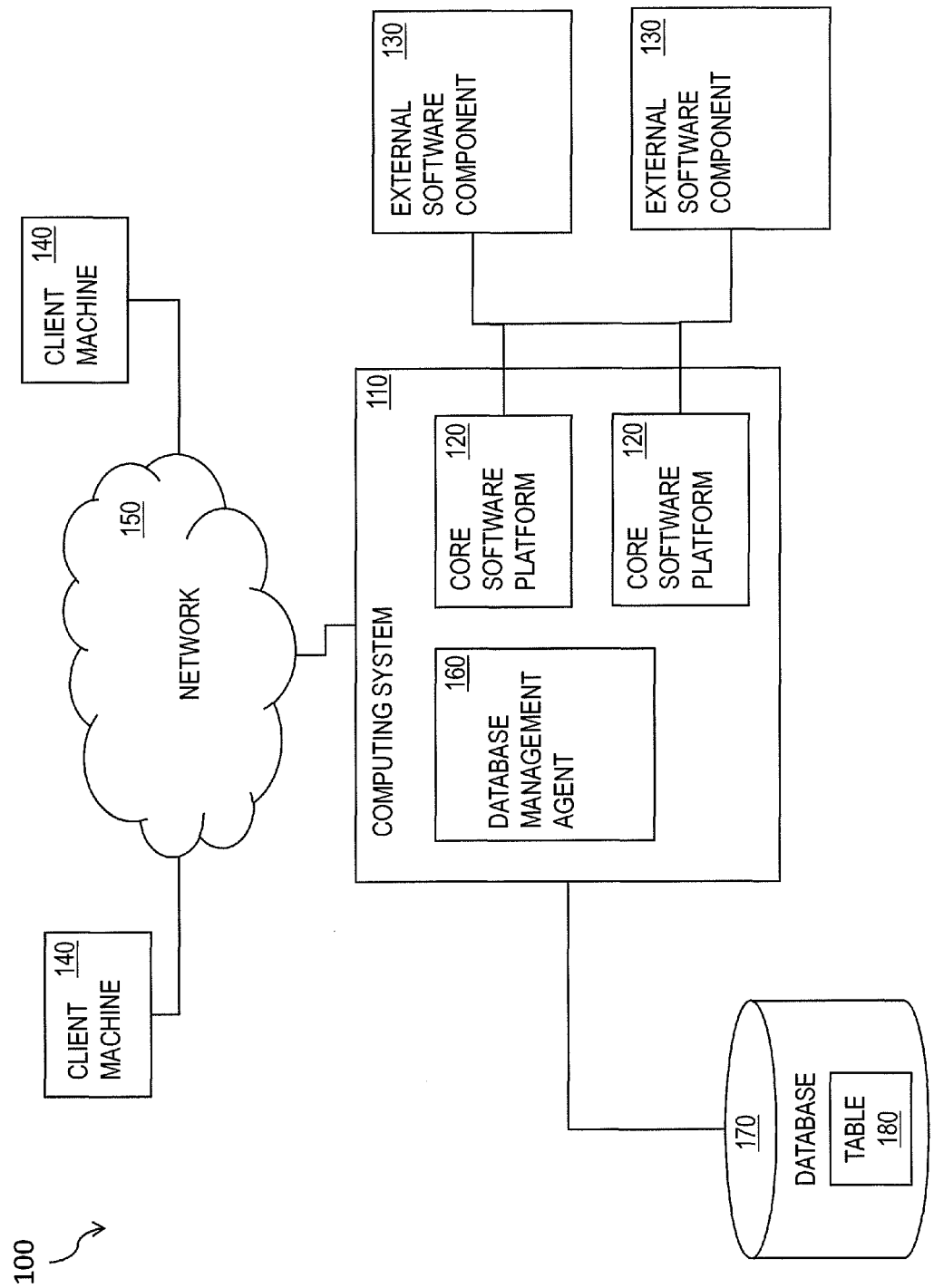
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc.) relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
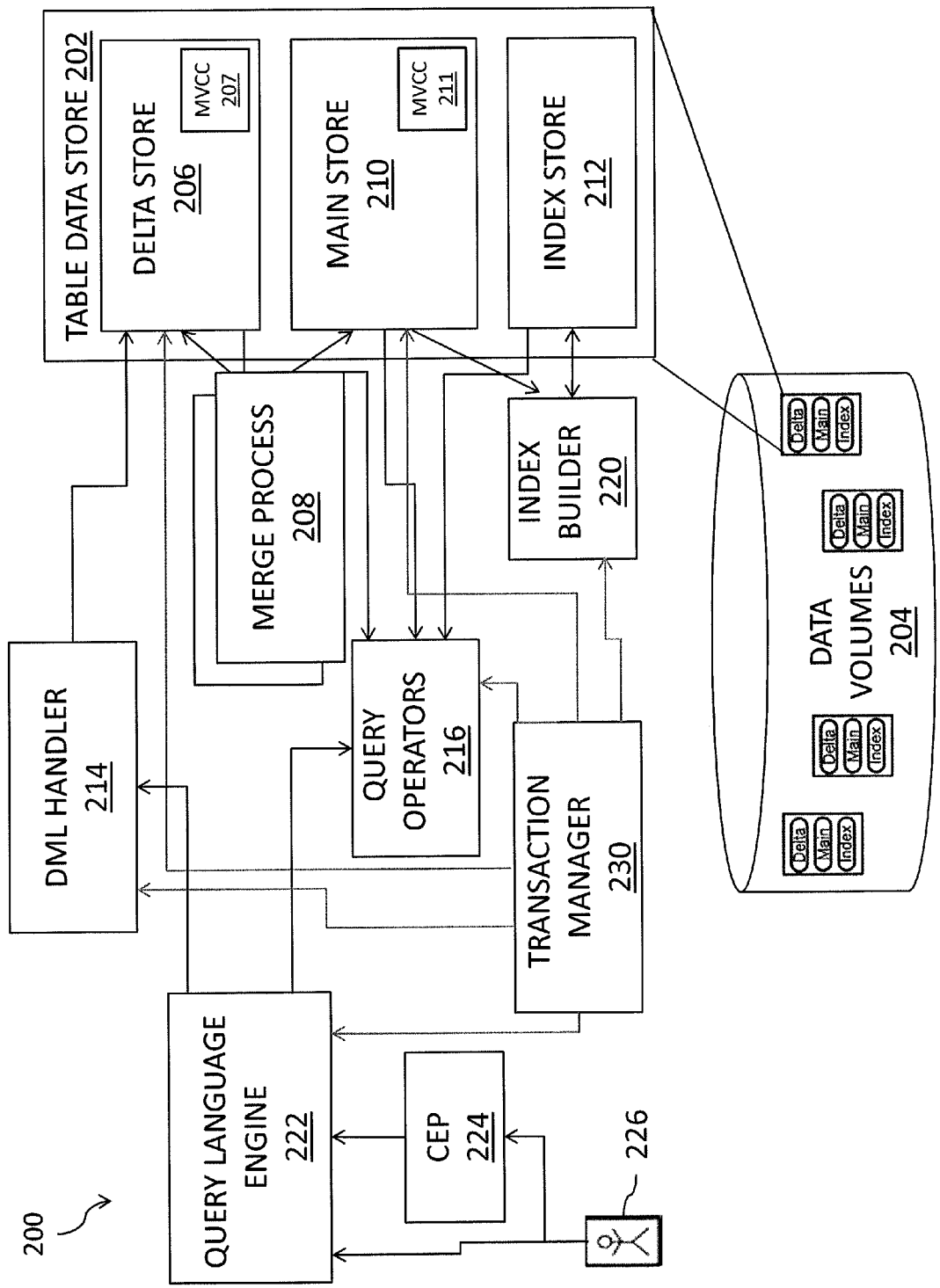
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein. The delta store 206 can include an MVCC store 207 that stores MVCC data for rows within such delta store 206 and, similarly, the main store 210 can include an MVCC store 211 that stores MVCC data for rows within such main store 210 (sometimes also referred to as row visbility information such as in FIG. 7).

Figure 3:
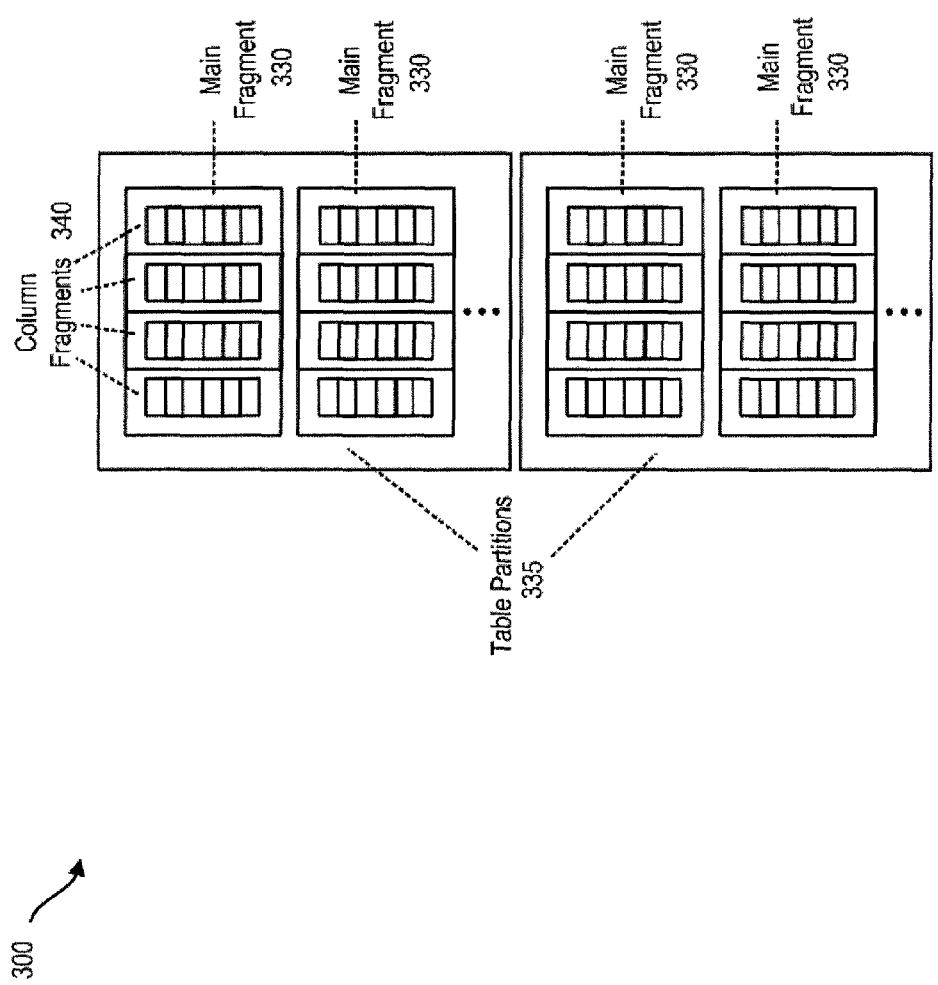
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query. Each fragment will have its own set of MVCC pages which are hosting the MVCC blocks that stores the (row state or timestamp information) metadata used for determining visibility of the rows. MVCC data is the metadata stored along with the actual columns data for determining the visibility of the row used along with the read snapshot timestamp. A transaction manger 230 can be coupled to the main store 210 (and the corresponding MVCC store 211) as well as the delta store 206 (and the corresponding MVCC store 207) to provide snapshot timestamps for read operations along with MVCC data (which in turn provides visibility data for the corresponding row).

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
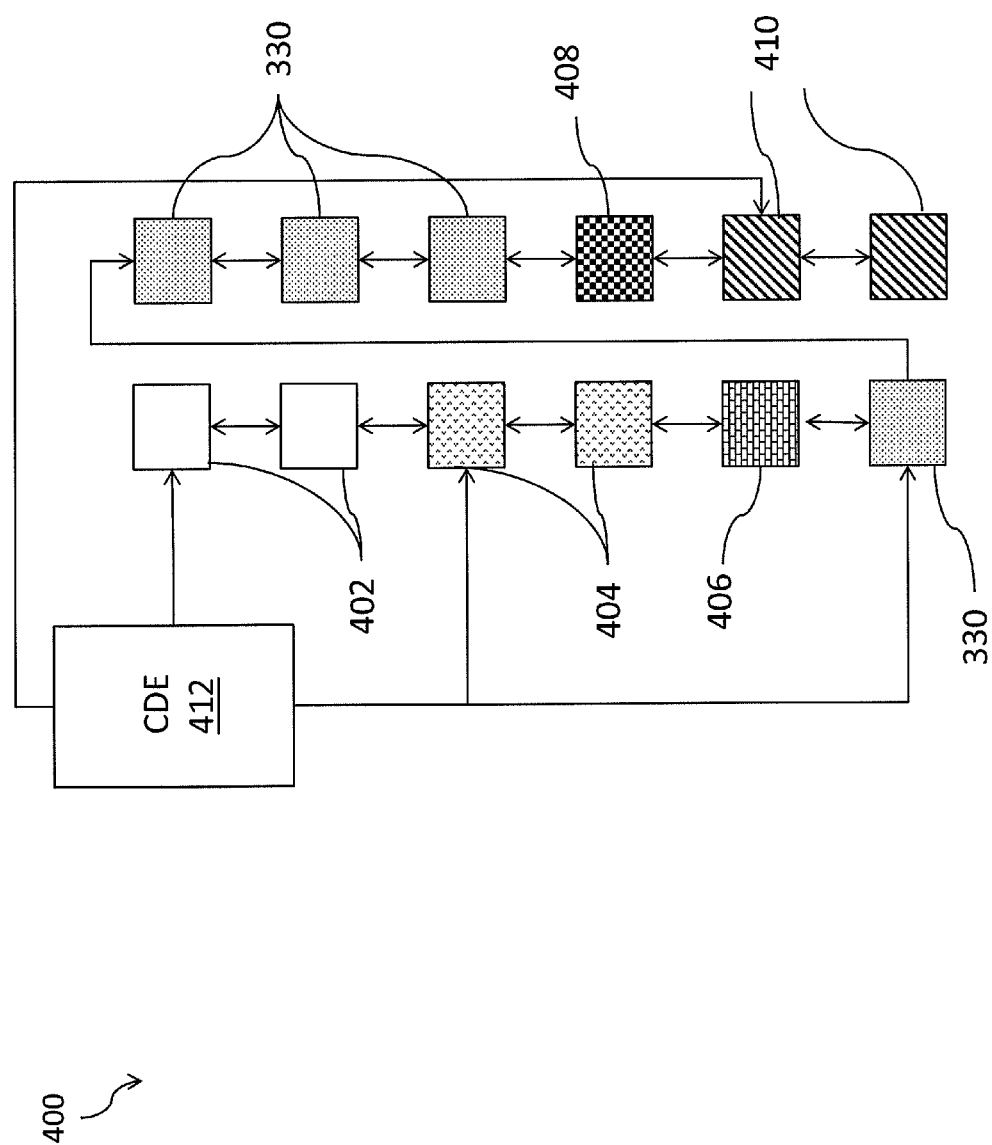
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the page is allocated, its size usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like.

Also as shown in FIG. 4, sub-chains of the page chain can be defined for a delta part, a main part, dictionaries, MVCC data, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. In addition, the delta part can also include an MVCC sub-chain 406 for MVCC data. The main part can also be subdivided into main fragments 330 and can include an MVCC sub-chain 408. Pages containing dictionary-compressed columnar data 410 can refer to pages containing dictionaries for them. Individual table parts can be loaded into main memory on-demand. A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID or RowPos.

Distinct from a logical RowID, the UDIV or DocID or RowPos (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

Figure 5:
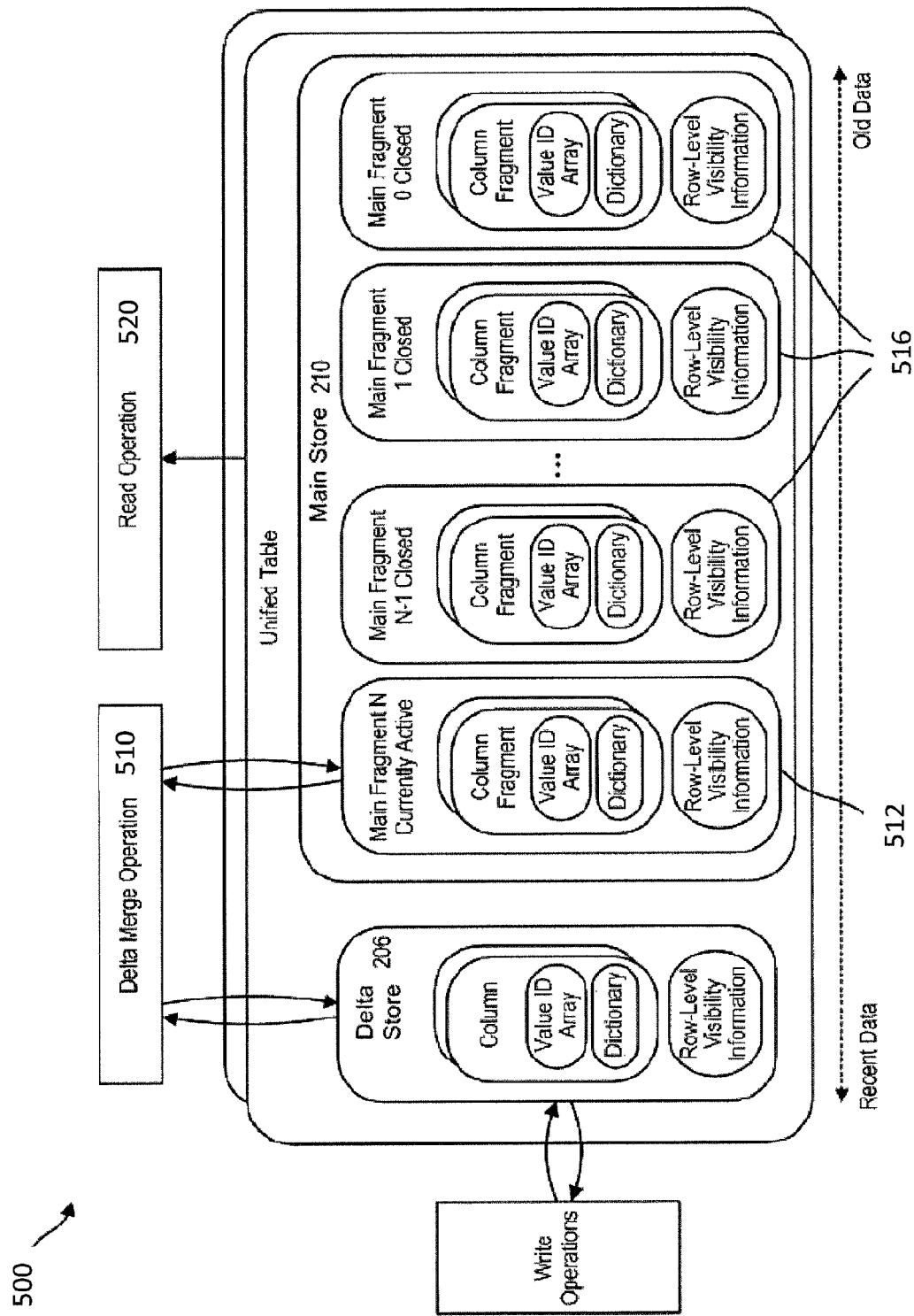
FIG. 5 is a functional block diagram illustrating performing a delta merge operation and a read operation using a unified table.

FIG. 5 shows a functional block diagram 500 for performing a delta merge operation 510 on a unified table. New transactions or changes can initially be written into delta store 206. Main store 510 can include one active fragment 512 and one or more closed fragments 516. When updates are merged from delta store 206 into the main store 210, existing records in the closed fragments 516 cannot be changed. Instead, new versions of the records can be added to the active fragment 512, and old versions can be marked as invalid.

Functional block diagram 500 also illustrates a read operation 520. Generally, read operations can have access to all fragments (i.e., active fragment 512 and closed fragments 516). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 6:
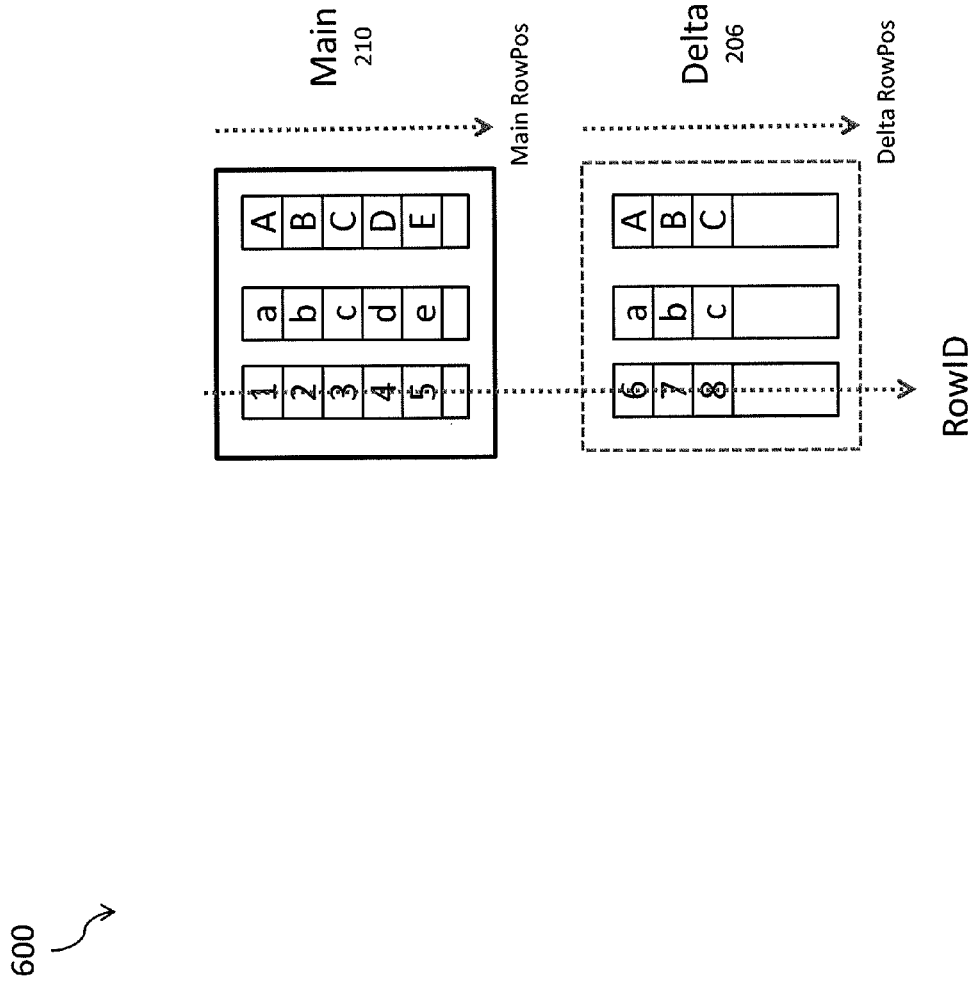
FIG. 6 is a diagram the relation between row position and row identifier.

With reference to diagram 600 of FIG. 6, as used by the database 180, the RowID is the identifier row in the table. Whether, the row is in the delta store 206 or the main store 210, the RowID remains the same but the RowID remains the same. The RowID is persisted. In contrast, the RowPos refers to the index of the row in the column vector of delta store 206 or main store 210. RowPos gives the physical location of the data within the fragment (i.e. delta2/delta/main) and will change after the delta merge operation. RowPos can be loaded in memory. MVCC data can be maintained based on the RowPos values. Each RowPos can be mapped to a slot in the MVCC page for retrieving its associated information.

Figure 7:
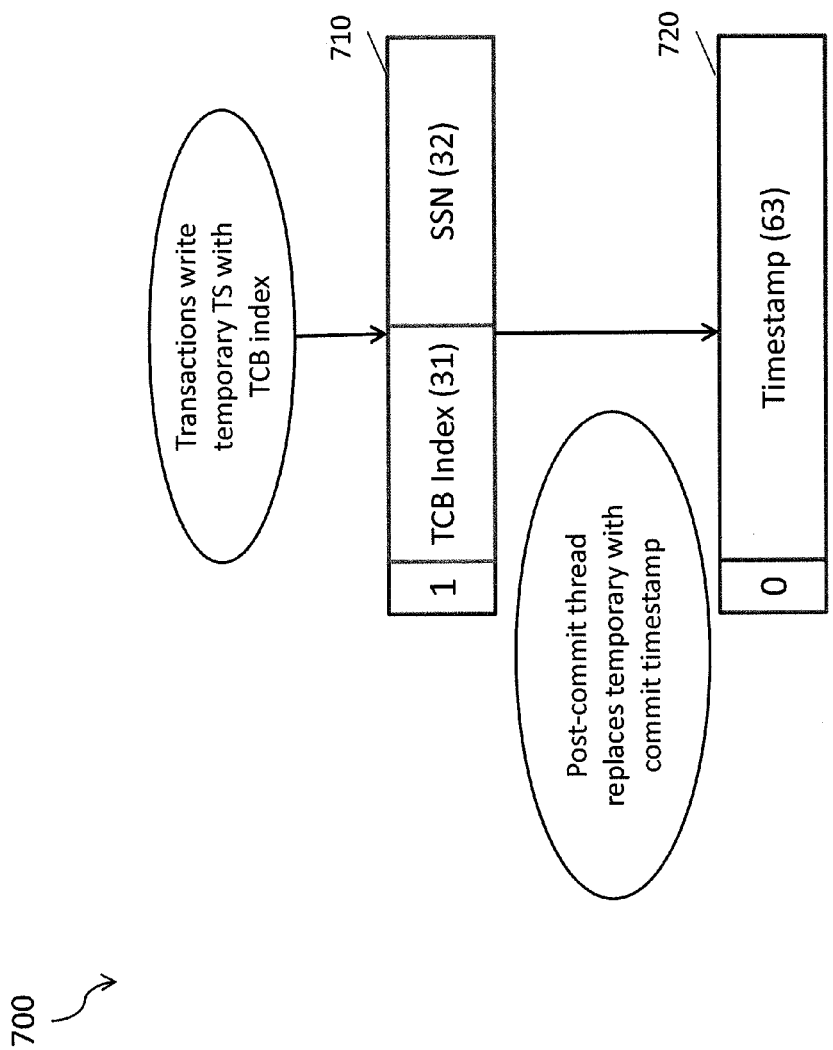
FIG. 7 is a diagram illustrating temporary and final timestamps for a row.

FIG. 7 is a diagram 700 that illustrates an MVCC timestamp. In this example the timestamp comprises a 64 bit value that can include a temporary timestamp 710 (as indicated by the initial bit) or a final timestamp 720 (as indicated by the initial bit). The temporary timestamp 710 can include a transaction control block (TCB) index which identifies the corresponding transaction as well as a statement sequence number (SSN) which can be assigned by a SQL engine. The TCB index, for example, can consume 31 bits, and the SSN can consume 32 bits. The final timestamp 720 can comprises a commit timestamp which can be obtained from a TCB. Transactions can initially write the temporary timestamp 710 with the corresponding TCB index. After the corresponding thread commits, the post-commit thread can replaces the temporary timestamp 710 with the final timestamp 720. With such an arrangement, 64 bit read and writes can be performed by atomic operations.

Further, only the initial bit can be used to differentiate between the temporary timestamp and the commit timestamp.

Figure 8:
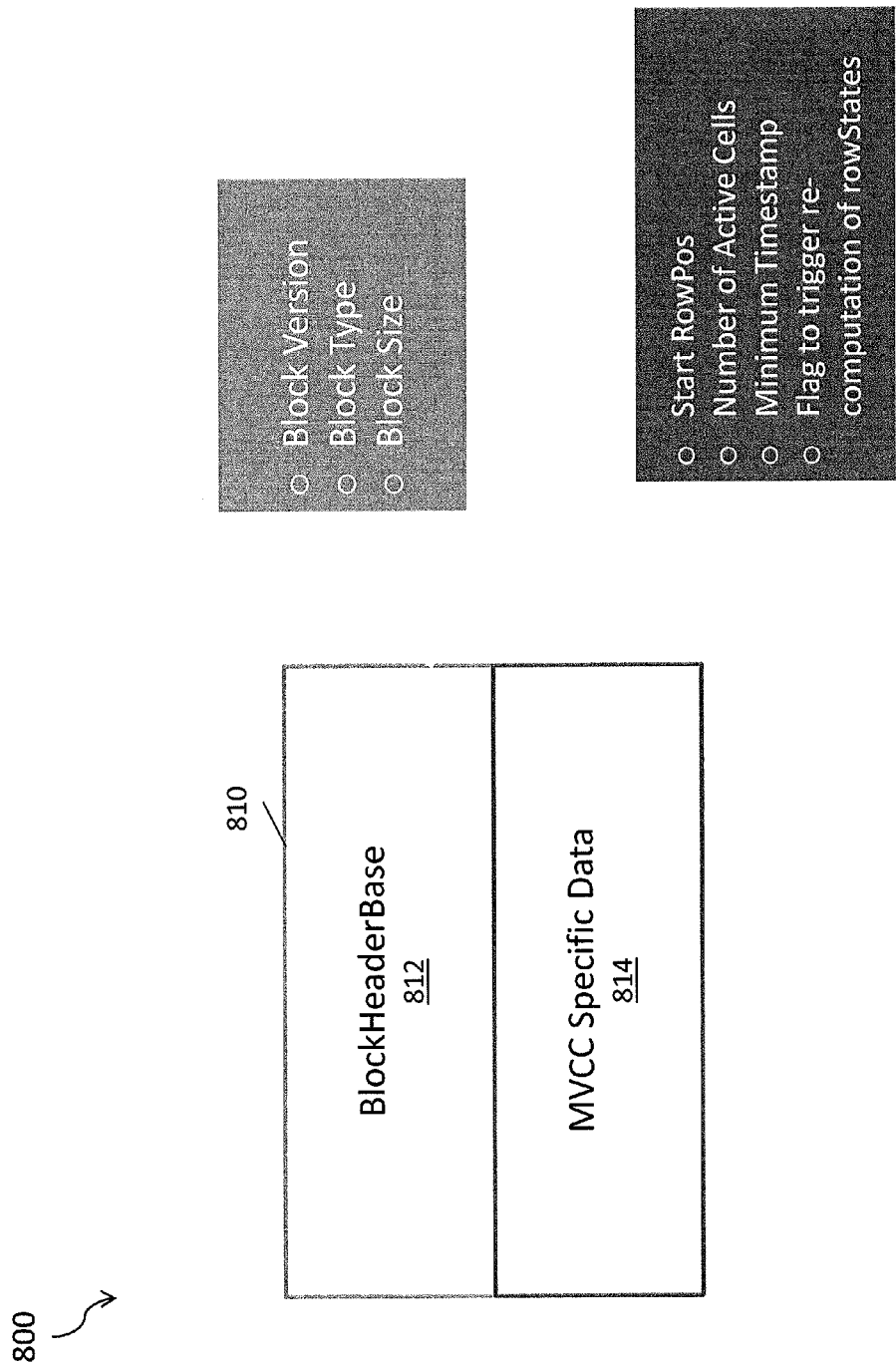
FIG. 8 is a diagram illustrating a block header.

With reference to diagram 800 of FIG. 8, each MVCC block can have a header 810. Such header 810 can include a generic block header in a first portion 812 and MVCC specific data in a second portion 814. The generic block header can encapsulate information such as block version, block type, and block size. The generic block header is a common structure for MVCC data blocks as well as dictionary blocks. The MVCC specific data can encapsulate information including, for example, a starting row position (RowPos), a number of active cells, a minimum timestamp, and a flag a flag indicating the state of the MVCC block that specify that it needs special handling due to earlier partial cleanup or post-commit operation caused by resource limitation errors. The number of active cells can be tracked for garbage collection purpose. If this value becomes 0, then the block will be garbage collected (i.e., the memory associated with the block will be cleared and freed, etc.). In addition, the minimum timestamp represents the tracking of the smallest timestamp in block (not 0) which can be used by a table-level garbage collection API to skip un-necessary blocks. Stated differently, block minimum timestamp and the number of active entries can be used for garbage collection of timestamp blocks by a cleanup thread or by table level garbage collection.

MVCC data can be persisted and can be stored in MVCC Pages (which can, for example, be derived from a regular block page but with an MVCC tag) and which can, for example, have a size of 256K. MVCC data can be addressed by indexing rowPos into a blocks in the MVCC page. Date can then be stored in blocks. These blocks can have varying sizes. In one example, the block can be 8K plus the size of the MVCC block header. Timestamp blocks can include CTS and DTS. In one example, the timestamp blocks can holds 1K entries, 8 byte value. RowState blocks can, for example, hold 32K entries with 2 bits per row. Stub blocks can include STUB_CTS, STUB_DTS, and STUB_RE-SERVED and can, for example, be 32 bytes and they can act as place holders from the garbage collected range (i.e. the range of rows are fully visible/invisible).

Blocks can be used in order to perform atomic operations and store data that can be indexed using bit-wise operations. For example, 8K data can easily be addressed by shifting (10 bits for TS or 15 bits for RS) of rowPos. Further, Bit shift operations are more efficient than multiplication, division or modulo operations.

MVCC blocks can have an index structure that can map rowPos to block. Such an index structure can provide lockless read and write operations. Further, the index structure can be dynamically grown so that it can increase the size of the structure while allocating new blocks. In addition, the MVCC index structure is advantageous in that it allows for consistent reads while, at the same time, dynamically growing the structure. The index structure can use versioned vectors [Header, Versioned data object] with additional logic in APIs that can store the MVCC information. This index structure can be used to retrieve the MVCC block information for the given RowPos. At the same time, the writes to the index structure can be synchronized using atomic operations. As the block size is fixed to 8K, block size along with size of the MVCC data (8 byte for timestamp and 2 bits row state) can be used to compute the offset into the index structure for retrieving the block.

The MVCC block can be represented by minimal information that can be stored using atomic operations. For example, the MVCC block header can be 32 bytes which cannot be stored using atomic APIs. Therefore, a structure referred to herein as a block handle (or sometimes a Block-Handle) can be stored in the versioned vector. The block handle can include a pointer to a corresponding block and a handle to a page associated with the block. In addition, the row position (rowPos) can be used to determine the location of the MVCC cell within an MVCC block.

Figure 9:
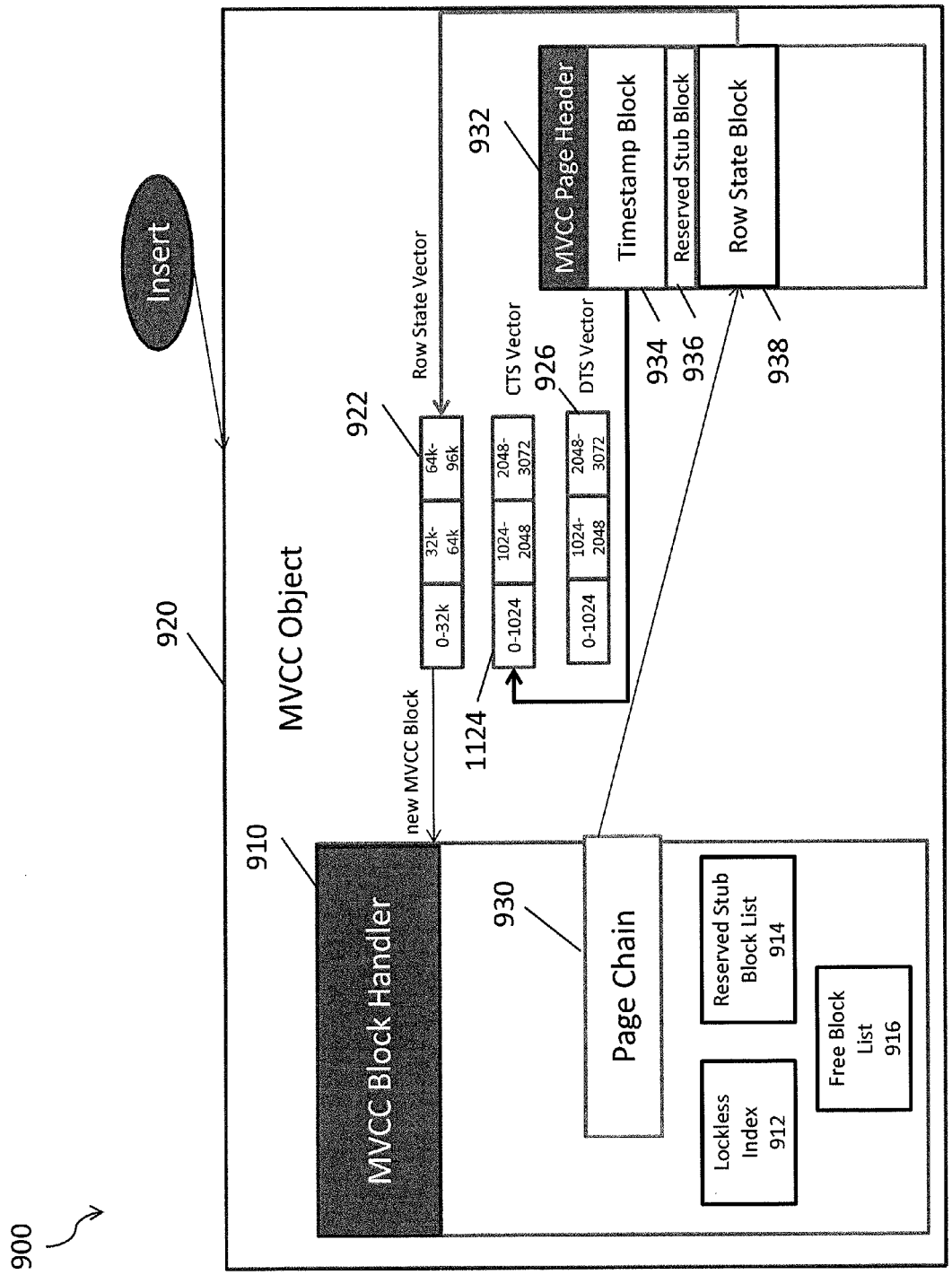
FIG. 9 is a process diagram illustrating an MVCC object with a paged MVCC block handler.

FIG. 9 is a diagram 900 illustrating an insert operation on an MVCC object 920. The MVCC object 920 encapsulating MVCC data can be used by and interact with a paged MVCC block handler 910 that creates new blocks, destroys particular blocks, and maintains a lockless free list of MVCC blocks, a lockless free list of reserved stub blocks, and a lockless free list of free stub blocks. The MVCC block handler 920 can provide APIs for lock-less allocation of MVCC blocks using, for example, a lockless index 912, a reserved stub block list 914, and a free block list 916. The MVCC block handler 920 can also maintains the free list of timestamp blocks (destroyed or garbage collected). Further, the MVCC block handler 920 can maintains the free reserved stub queue and free stub queue (used and replaced).

To effect such functionality, the MVCC object 920 can include a row state vector 922, a confirm timestamp vector 924, and a delete timestamp vector 926. In addition, the MVCC block handler 910 can include a page chain 930 of pages which can each include an MVCC page header 932. The page header 932 can, in turn, specify/encapsulate a timestamp block 934, a reserved stub block 936, and a row state block 938. The MVCC object 920 (as part of the insert operation) can request a new MVCC block from the MVCC block handler 910 if so indicated by the row state vector 922. Thereafter, a new MVCC block is allocated and the row state block 938 in the page chain 930 is updated to reflect the same. Further, after the insert operation commits, the commit timestamp is stored in the timestamp block 934 and the CTS vector 924 is accordingly updated. The reserved stub block 936 can be generated as part of the timestamp block 934 allocation/generation and can be used as described below.

As referenced above, a stub block (referred to herein sometimes just as a stub) can represent a range of row position values having timestamp values that have been garbage collected. During cleanup/garbage collection, if the timestamp values of all the rows/entries in a block are zeros, then such block can be replaced with a stub. After replacing the stub, the earlier timestamp block can be moved to a free list and will be later used by another task.

Stub blocks can persist the fact that rows associated with the range are committed deleted rows (INVISIBLE, 0, 0) rather than unused rowPos values (INVISIBLE, INT64_MAX, INT64_MAX). As a result, stub blocks can extend the values provided by the row state bits. This differentiation is required to generate a list of valid values and invalid values.

Stub blocks can be allocated while allocating the timestamp block and can be used by a cleanup thread for replacing it with a regular block without allocating (which can lead to resource related exceptions) from a page. Further, stub blocks allocated as part of timestamp block allocation can be characterized as reserved stub blocks which can be maintained in a free reserved stub block list. Cleanup threads use one of the reserved stub blocks from the list and marks it as STUB_CTS or STUB_DTS based on the type block information vector.

Figure 10:
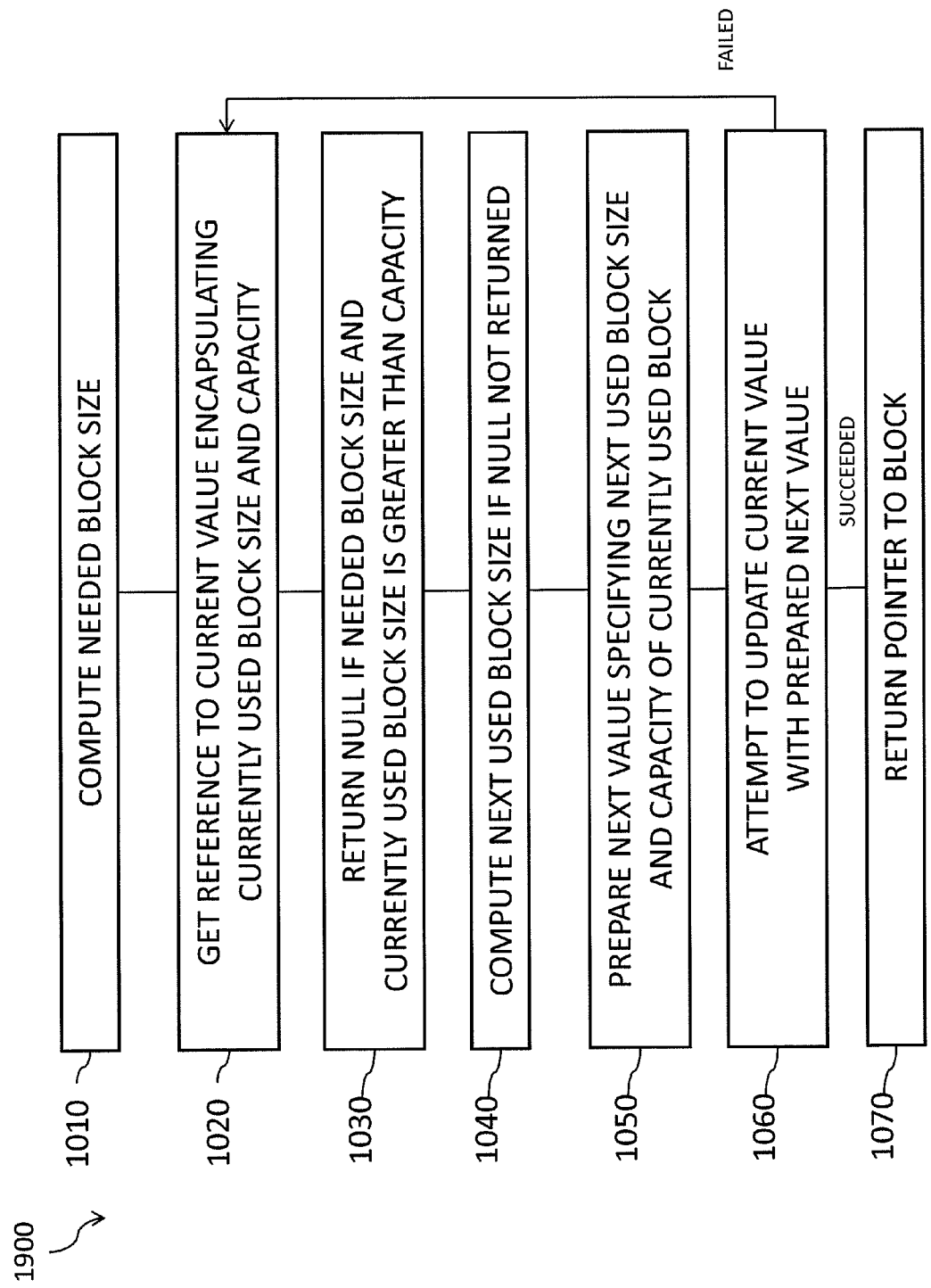
FIG. 10 is a process flow diagram illustrating lockless block allocation from a page in a page chain.

FIG. 10 is a process flow diagram 1000 for lockless block allocation from a page. In one implementation, every page (Dictionary, MVCC, Data pages) can have 64 bit value consisting of {usedSize, capacity}. The usedSize can refer to the number of bytes that are used for the blocks and capacity can refer to the capacity of the page in bytes. An allocateBlock function can get (sizeOfBlock). Initially, at 1010, the needed size of the block can first compute the needed size. Thereafter, at 1020, a reference to a current value (e.g., 64 bit value) that encapsulates both currently used size (curUsedSize) and capacity. If, at 1030, the needed size plus the currently used size exceeds capacity then a NULL can return NULL which indicates that there is no space for the block in the page. Otherwise, at 1040, the next used size is computed (which is the sum of the currently used size and the needed size). A next value (e.g., 64 bit value) can then be prepared, at 1050, that comprises the next used block size and capacity of the currently used block. The prepared next value can then, at 1060, be used to update the page using, for example, a compare and swap operation (CAS). If the attempt to update the page fails, then 1020-1060 can be repeated until such time that the CAS succeeds or there is no space in page. If the page is successfully updated, at 1070, a pointer is then returned to the corresponding block.

Figure 11:
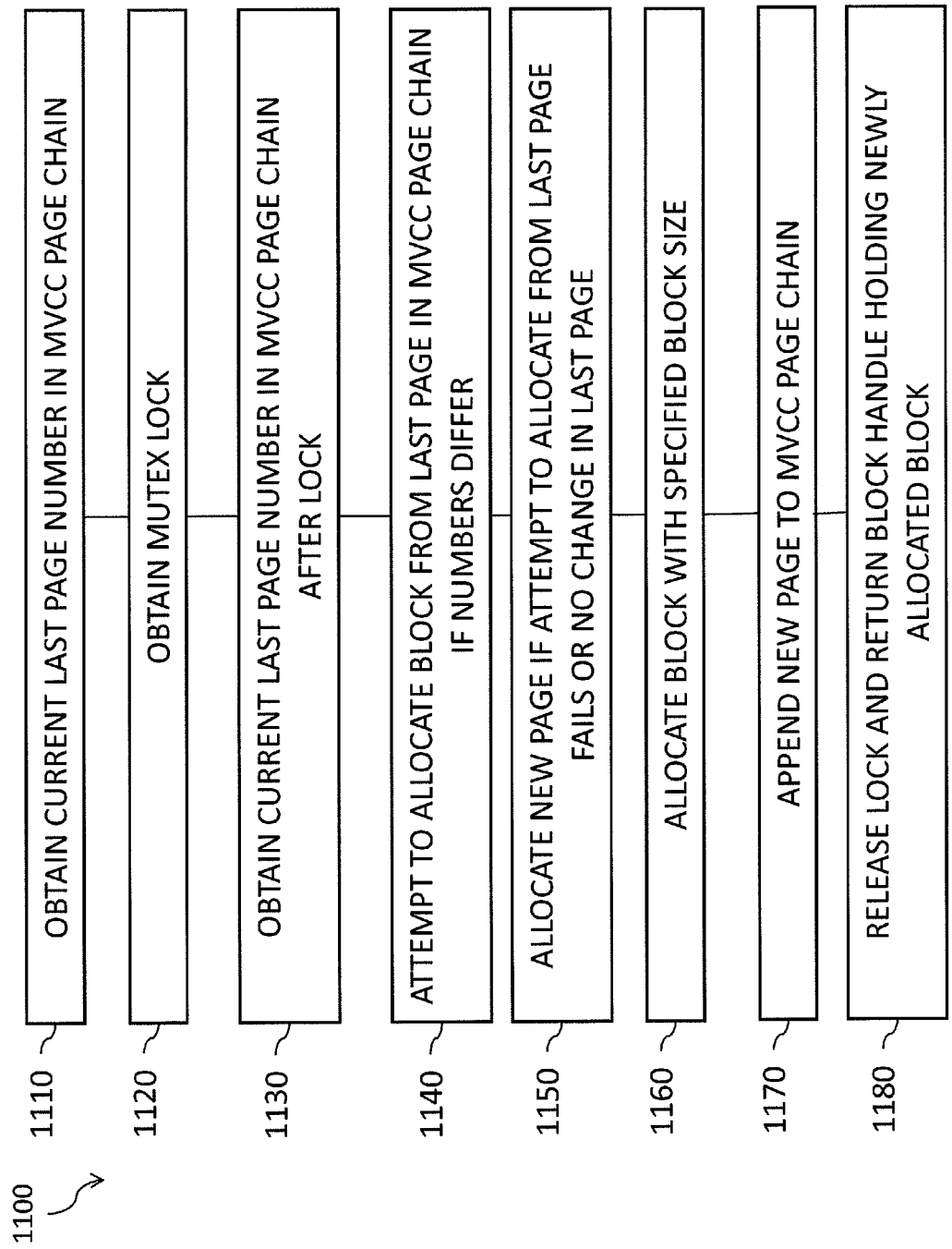
FIG. 11 is a process flow diagram illustrating allocating an MVCC block from a new page in an MVCC page chain.

FIG. 11 is a process flow diagram for allocating an MVCC block from a new page. Initially, at 1110, a current last page number in the MVCC page chain (e.g., last_before_lock) can be obtained. Next, at 1120, a mutex can be acquired that avoids allocation of the pages by multiple threads. In addition, at 1130, a current last page number in the MVCC page chain (e.g., last_after_lock) can be obtained. If, at 1140, last_before_lock and last_after_lock differs then it can be attempted to allocate a block from the last page in the MVCC page chain. If such block allocation fails (i.e., the attempt fails) or there is no change in the last page (before and after mutex) then, at 1150, a new MVCC page can be allocated. Subsequently, at 1160, a block can be allocated with the specified block size (based on the type of the block i.e. CTS/DTS/Rowstate requires 8K+header size whereas the stub blocks requires only the size of the header) from the newly allocated page using lockless block allocation logic that returns the pointer to the block. The newly allocated page can then, at 1170, be appended to the MVCC page chain. Thereafter, at 1180, the mutex can be released and the block handle holding the newly allocated block can be returned.

Figure 12:
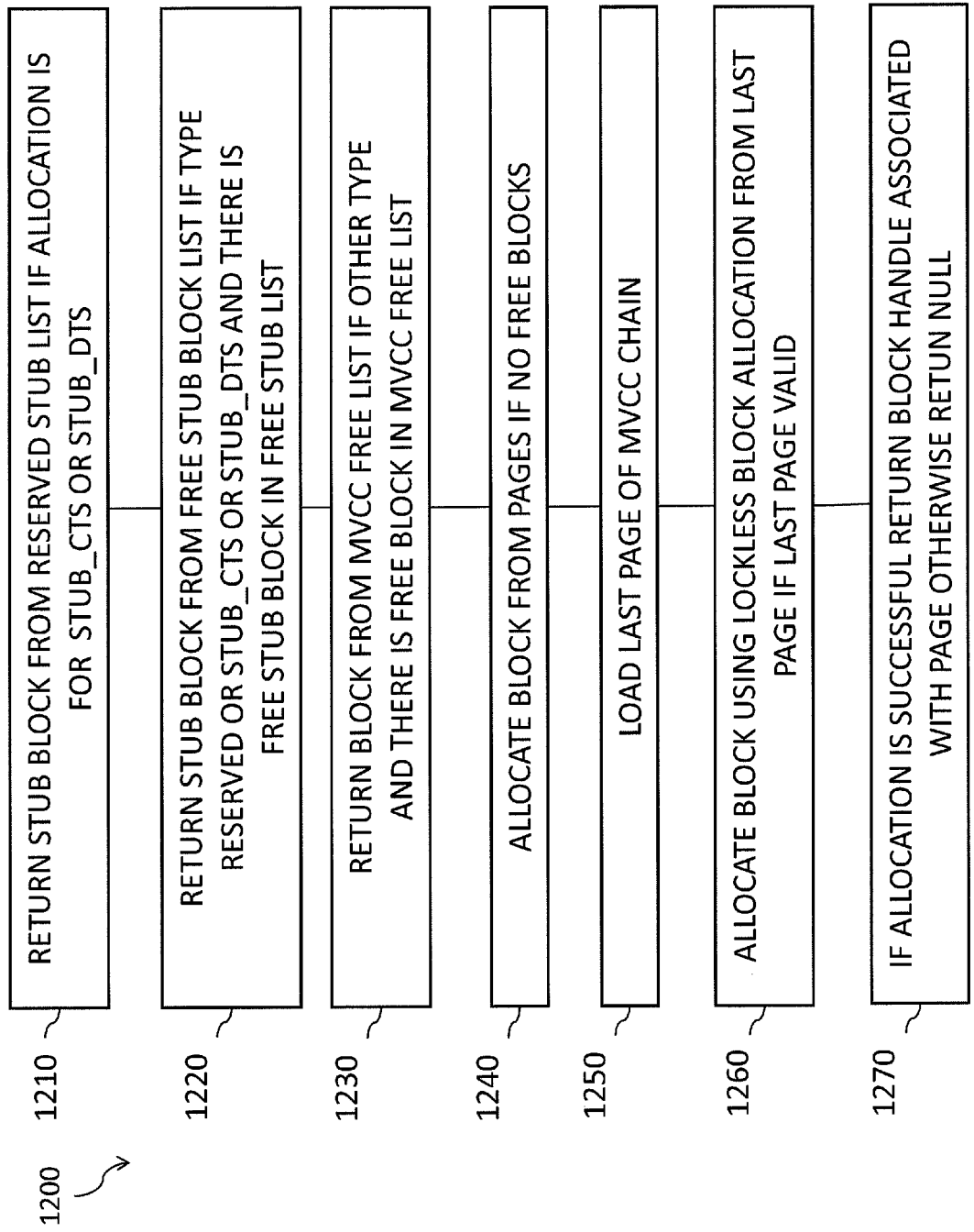
FIG. 12 is a diagram illustrating allocating an MVCC block from a last page in an MVCC page chain.

FIG. 12 is a process diagram 1200 for allocating an MVCC block from a last page. Initially, at 1210, if the block type is stub_cts or stub_dts then the block is returned from the reserved stub list. Next, at 1220, if the block type is reserved_stub or stub_cts or stub_dts, then it can be checked if there is any free stub block from free stub list. If a free stub block exists, then the stub block is returned from the free list. For other block types, at 1230, it can be checked if there is any free block in the free MVCC block list then the free block can be returned from the free list. If there are no free blocks them, at 1240, block can be allocated from pages. Next, at 1250, the last page of the MVCC page chain can be loaded. If the last page is valid then, at 1260, the block can be allocated using lockless block allocation API from the last page with the appropriate block size. Subsequently, at 1270, the block handle associated with the newly allocated block can be returned if the allocation was successful, otherwise a NULL can be returned.

Figure 13:
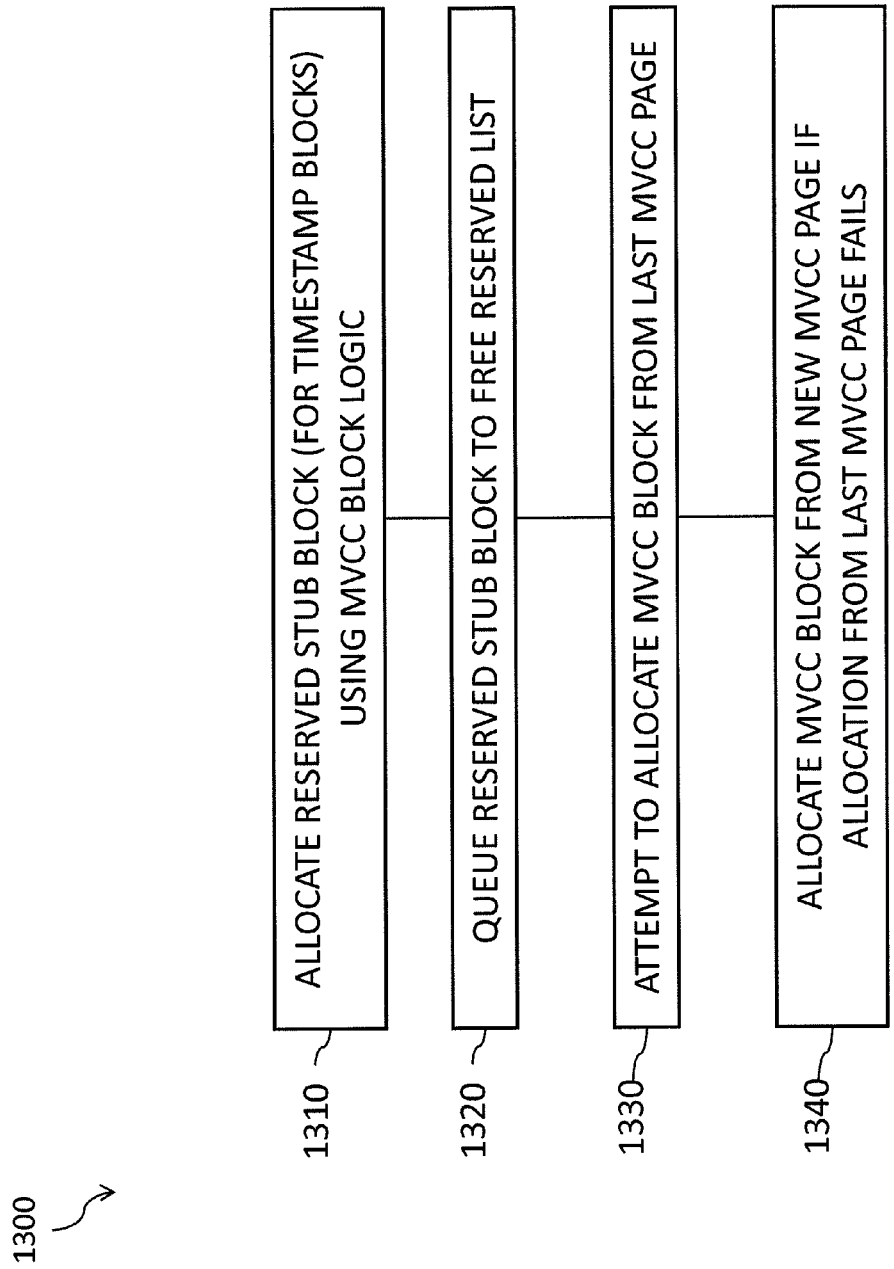
FIG. 13 is a process flow diagram illustrating allocation of a block.

FIG. 13 is a process flow diagram 1300 for generating a new MVCC block. For the timestamp block, at 1310, the reserved stub block can be allocated using new MVCC block logic. Next, at 1320, the reserved stub block is queued to the free reserved stub list. An MVCC block with the appropriate size is then, at 1330, allocated from the last MVCC page. If the allocation fails, then, at 1340, the block can be allocated using the newly allocated MVCC page.

Figure 14:
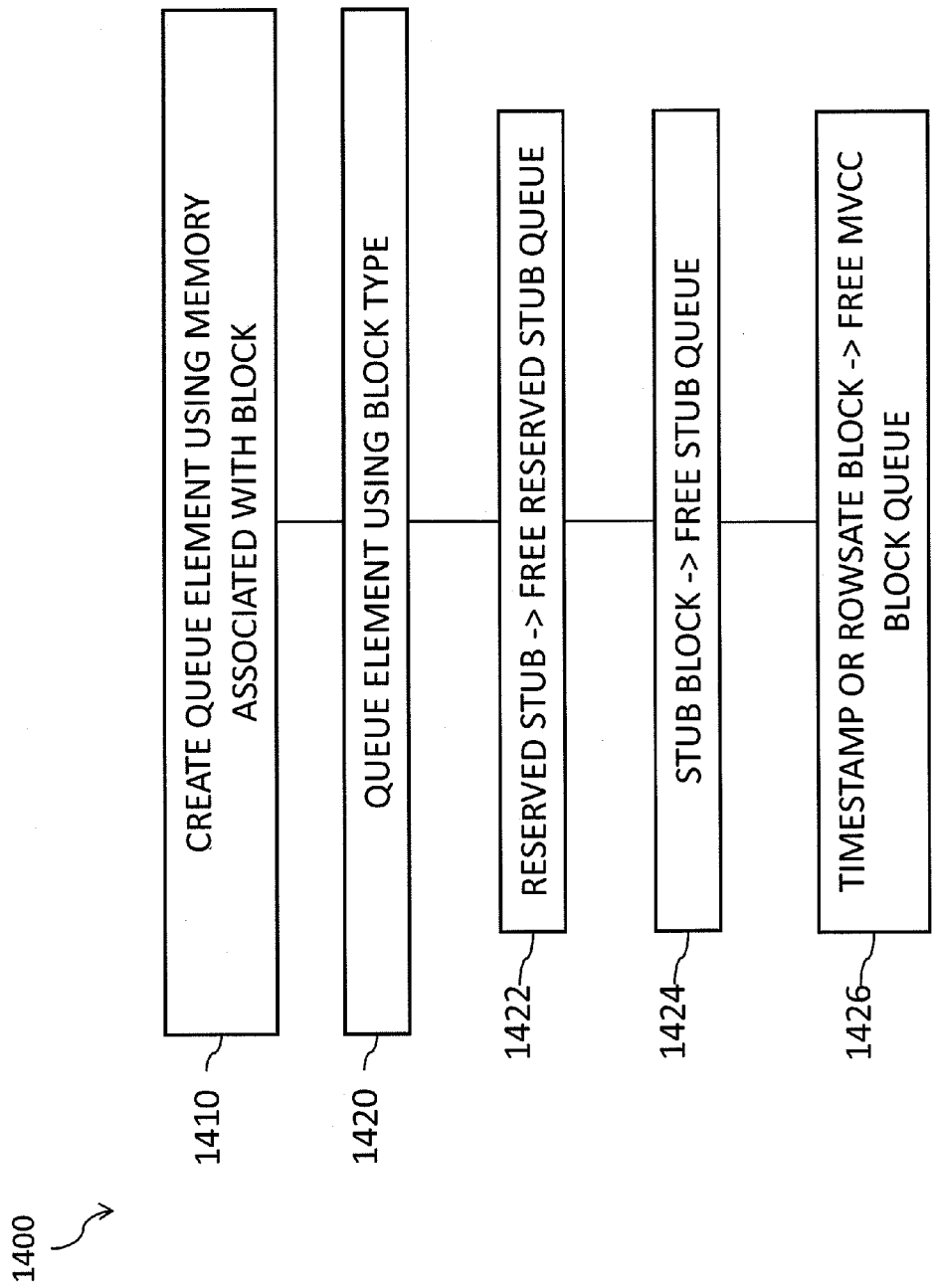
FIG. 14 is a process flow diagram illustrating queuing of elements using block types.

FIG. 14 is a process flow diagram 1400 for moving a block to a free queue (also referred to as a free list). The free queue is a lockless queue structure which can provides push and pop to add and remove elements safely. At 1410, a queue element can be created using the memory associated with block (i.e., interpret block address as a queue element, etc.). Thereafter, at 1420, the element can be queued using the block type. This queuing can be accomplished by queuing, at 1422, a reserved stub block to the free reserved stub queue, queuing, at 1424, a stub block to the free stub queue, or by queuing, at 1426, a timestamp or row state block to a free MVCC block queue.

Figure 15:
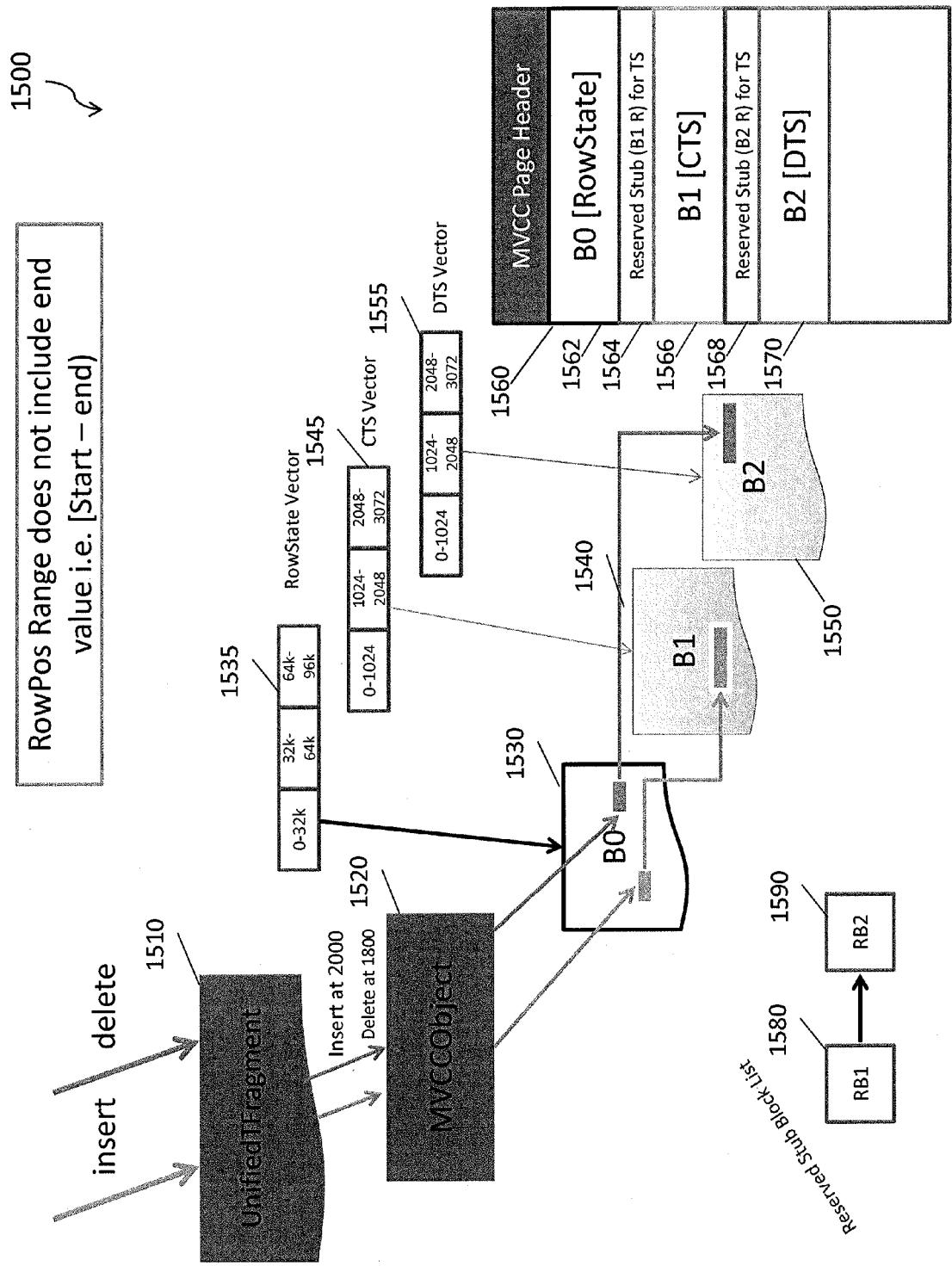
FIG. 15 is a diagram illustrating writing of multi-version concurrency control data.
Figure 16:
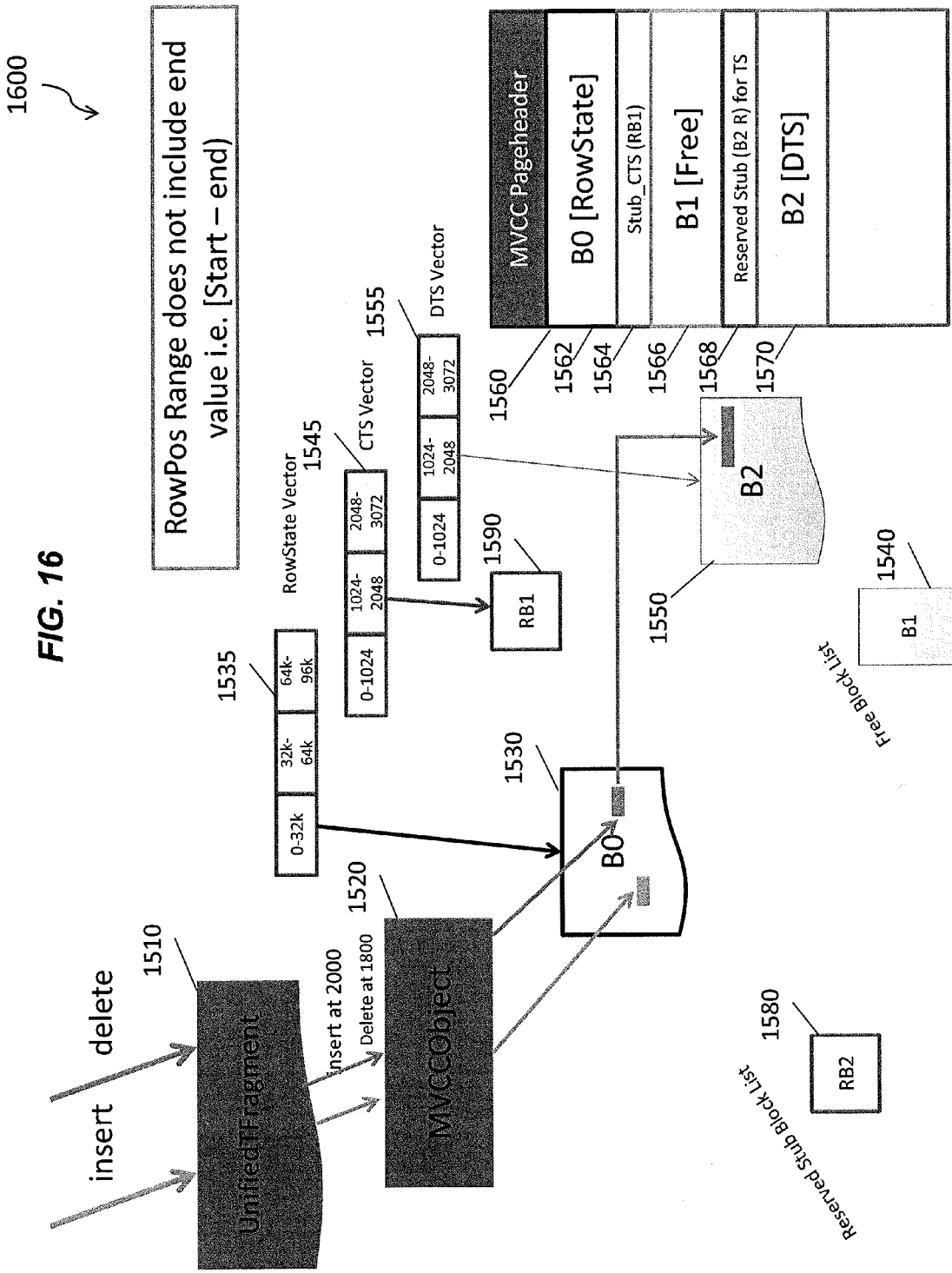
FIG. 16 is a diagram illustrating reading of multi-version concurrency control data.

FIGS. 15 and 16 are respectively diagrams 1500, 1600 illustrating write operations (both insert and delete) in a unified table fragment 1510. In particular, the diagrams 1500, 1600 illustrate states of pages, timestamp blocks, and free lists associated with paged a MVCC block handler. As this example allocates two timestamp blocks, there are two reserved stub blocks in the queue. Initially, a client seeks to insert an entry at row position 2000 (which is just an example row position) of the unified table fragment 1510. A corresponding MVCC object 1520 is then accessed which, in turn, points to a first block 1530 (which forms part of an MVCC page 1560). The first block 1530 comprises a row state vector 1535 that characterizes the particular state for the row (which in this case shows as visible). Thereafter, the insertion is completed and a CTS vector 1545 in a linked second block 1540 is updated with a timestamp that corresponds to the time at which the insertion operation was committed and then the row state in the row state vector 1535 is updated to reflect same.

With the deletion operation, a client seeks to delete an entry at row 1800 of the unified table fragment 1510. Thereafter, an MVCC object 1520 (not necessarily the same object as used in the insertion operation), is accessed which, in turn, points to a first block 1530 (forming part of the MVCC page 1760). The first block 1530 comprises the row state vector 1535 which characterizes the particular state for the row (which in this case shows the row as visible). After the entry at 1800 is deleted, the DTS vector 1555 in a linked block 1550 is updated with the corresponding timestamp.

After this sequence of operations, the MVCC page 1560 comprises a first slot 1562 comprising the row state from the first block 1530, a second slot 1564 comprising a reserved stub for the CTS timestamp, a third slot 1566 comprising a CTS timestamp from the second block 1540, a fourth slot 1568 comprising a reserved stub for for the DTS timestamp, and a fifth slot 1570 comprising a DTS timestamp.

After the state in diagram 1500 of FIG. 15, if there are 1024 inserts that landed into the same CTS block then the entire block is used. Once all the transactions associated with 1024 rows are committed, postcommitted and cleanedup then the timestamp lock can be replaced with a stub block. This stub block can be allocated by taking stub block from the reserved stub block and there will be on element in the free timestamp blocks. After the state of diagram 1500, the MVCC page 1560 can comprise a first slot 1562 comprising the row state from the first block 1530, a second slot 1564 comprising a stub for the CTS timestamp in which the CTS vector references a first reserved stub block 1580 (from a reserved stub block list that also includes a second reserved stub block 1590), a third slot 1566 indicating that the second block 1540 is free (i.e., the second block 1540 is on a free list), a fourth slot 1568 comprising a reserved stub for the DTS timestamp, and a fifth slot 1570 comprising a DTS timestamp.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   initiating lockless allocation of a block from a page by computing a needed block size from an original value in a page header, the original value comprising a currently used block size of the page and a capacity of the page;
   computing a next used block size based on the currently used block size and the needed block size and a remaining capacity of the page after allocation of the block from the page;
   generating a new value comprising the next used block size of the page and the remaining capacity of the page; and
   replacing the original value in the page header with the new value.

2. The method of claim 1, wherein the replacing uses a compare and swap operation.

3. The method of claim 2, wherein the computing and generating are iteratively implemented until the original value is replaced with the new value in the page header.

4. The method of claim 1 further comprising:
   returning a pointer to the block after replacing the original value in the page header with the new value in the page header.

5. The method of claim 4, wherein the pointer points to a location in the page that is computed from the block size from the page header plus the currently used block size.

6. The method of claim 4, wherein the location is part of a block handle.

7. The method of claim 1, wherein the initiating computing, generating, and replacing are implemented by at least one hardware data processor.

8. The method of claim 7, wherein the at least one hardware data processor forms part of an in-memory database.

9. A method comprising:
initiating allocation of a block from a new page in a multi-version concurrency control (MVCC) page chain by obtaining a first current last page number in the MVCC page chain;
acquiring a mutex lock that prevents allocation of pages in the page chain;
obtaining a second current last page number in the MVCC page chain;
attempting to allocate a block from a last page in the MVCC page chain if the first current last page number and the second current last page number differs;
allocating a new MVCC page in the MVCC page chain if the attempt to allocate the block fails or if there is no change in the last page;
allocating a new block with a specified block size from a newly allocated page using lockless block allocation logic that returns a pointer to the block;
appending the allocated new page to the MVCC page chain; and
releasing the mutex lock and returning a block handle holding the allocated new block.

10. The method of claim 9, wherein the method is implemented by at least one hardware data processor.

11. The method of claim 10, wherein the at least one hardware data processor forms part of an in-memory database.

12. A method comprising:
initiating allocation of a block from a last page in a multi-version concurrency control (MVCC) page chain by attempting to return a block from a lockless free list, or, if no block is available, then allocating a block from the last page;
loading a last page of the MVCC page chain;
attempting to allocate the block using lockless block allocation from the last page in the MVCC page chain if the last page is valid;
allocating the block from a new page if the attempt to allocate fails or there are no changes in the pages; and
returning a block handle associated with allocated new block.

13. The method of claim 12, wherein the lockless free list is a free reserved stub list, a free stub list, or free MVCC block list.

14. The method of claim 13, wherein each of the operations are implemented by at least one hardware data processor.

15. The method of claim 14, wherein the at least one hardware data processor forms part of an in-memory database.

16. The method of claim 13, wherein the free list comprises destroyed MVCC blocks and is managed as a lockless queue.

17. The method of claim 13 further comprising:
returning the block from an MVCC free block list for blocks with header and data sections.

18. The method of claim 13 further comprising:
returning the block from a free reserved stub list or free stub list for stub timestamp blocks;
wherein the block comprises only a header section.

19. The method of claim 13 further comprising:
returning the block from a free stub block list or allocating the block from the pages using a lock-less block allocation algorithm;
wherein the block comprises only a header section.

20. The method of claim 13 further comprising:
attempting to allocate a block from the MVCC pages of the MVCC page chain either from a last page or from a newly allocated page.

* * * * *